Oct. 6, 1959 L. A. RUSSELL 2,907,987

MAGNETIC CORE TRANSFER CIRCUIT

Filed Aug. 16, 1955 3 Sheets-Sheet 1

INVENTOR
LOUIS A. RUSSELL

BY *William V. Schelberg*
AGENT

Oct. 6, 1959 L. A. RUSSELL 2,907,987
MAGNETIC CORE TRANSFER CIRCUIT
Filed Aug. 16, 1955 3 Sheets-Sheet 2

INVENTOR
LOUIS A. RUSSELL
BY
William V. Schellberg
AGENT

INVENTOR
LOUIS A. RUSSELL
BY
William V. Schelberg
AGENT

United States Patent Office 2,907,987

Patented Oct. 6, 1959

2,907,987

MAGNETIC CORE TRANSFER CIRCUIT

Louis A. Russell, Poughkeepsie, N.Y., assignor to International Business Machines Corporation, New York, N.Y., a corporation of New York

Application August 16, 1955, Serial No. 528,594

19 Claims. (Cl. 340—174)

This invention relates to magnetic memory circuits, and particularly to registers of the type employed in digital computing apparatus.

A magnetic core register using two cores per digit has been described by Wang and Woo in an article appearing in the Journal of Applied Physics, vol. 21, January 1950, and entitled "Static Magnetic Storage and Delay Line." Binary information is represented in such a register as opposite remanence states of the cores with the establishment of a particular state controlled by current pulses applied to windings positioned about them. Each core is provided with an input, output and shift winding, with the input winding of one core coupled to the output winding of the preceding core through a coupling circuit. The shift windings of alternate ones of the cores are energized as separate groups with a current pulse tending to establish a zero or datum residual state. If the shift pulse acts on a core in a binary one state it is caused to change to a zero state and at the same time, develop a current pulse in its output winding of sufficient magnitude to drive the input winding of the next succeeding core and change that core from a zero to a one state. Shift pulses are applied, spaced apart in time, to alternate core groups so that each pair of shift pulses advances the information two core positions and the intermediate cores are cleared.

When the shift winding on a core is energized and a change in flux occurs, each other winding associated with that core tends to develop an induced voltage. With a one state being advanced, the input winding of the energized core develops a voltage as well as the output winding so that the information tends to be transferred in both directions. In the forward direction the output winding pulse is fed to the input winding of the next succeeding core to change it from a zero to a one state and the windings of this core also develop an induced voltage, with that appearing across its output winding tending to store a zero in the next succeeding core. To avoid undesirable loading of the core to which the desired information is directed, a series diode is provided in the coupling circuit. To prevent a backward transfer of the pulse information to the core preceding the one being read out, a shunt diode and series resistor are provided, or an opposing voltage is developed across a series resistor so that the retrograde pulse is dissipated or blocked. A circuit arrangement providing a blocking voltage as developed by the output from the core being shifted and simultaneously producing the undesirable retrograde pulse is described and claimed in the copending application of M. K. Haynes, Serial No. 430,059, filed May 17, 1954, and which is assigned to the same assignee.

The diodes used in this and other prior art registers as described operate with large back voltages, have low current carrying capacity, develop heat at high speeds and require considerable power necessitating the use of laminated metallic cores or so called tape cores with windings having a large number of turns. It is an object of the present invention to avoid the use of diodes and to provide an all magnetic core delay line wherein a further core and a resistance operates as a coupling device to replace the diodes conventionally used.

A further object of the invention is to provide a shift register using only magnetic cores and resistor elements.

Another object of the invention is to provide an improved magnetic core register wherein the back transfer of information is eliminated.

A still further object is to provide a shift register wherein lower power requirements are achieved allowing the use of ferrite cores with windings comprising relatively few turns.

Still another object of the invention is to provide a device including a saturable coupling core for controlling the transfer of pulses between storage cores having a predetermined coercive force threshold.

Other objects of the invention will be pointed out in the following description and claims and illustrated in the accompanying drawings, which disclose, by way of example, the principle of the invention and the best mode, which has been contemplated, of applying that principle.

Figure 1:
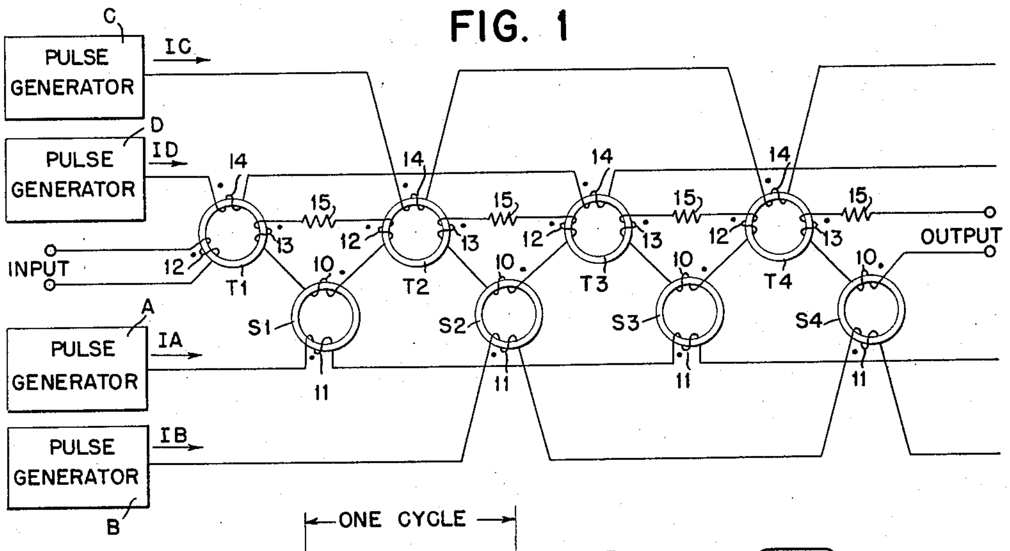
Figure 1 is a circuit diagram of a magnetic core shift register comprising one embodiment of the invention and employing the threshold coercive force of a storage core in preventing spurious response.

Referring to Figure 1, a four stage delay line is shown wherein the back transfer of information is eliminated without resorting to the use of diodes. Each stage comprises a storage core S and associated coupling core T, both of which may be of square loop magnetic ferrite material. It is essential that the storage cores exhibit a rectangular hysteresis characteristic, however, the coupling cores need only be capable of attaining opposite stable remanence states. The storage cores S are provided with a control winding and a shift winding designated 10 and 11 respectively, and the coupling cores T are provided with an input winding 12, output winding 13 and reset winding 14.

As shown in the figure, a dot marking is placed adjacent one end of each of these windings to indicate polarity, with current flow into the dot marked terminal tending to switch the core to a binary zero state of remanence.

The control winding 10 of each storage core S serves both input and output functions and is connected in series with the output winding 13 of its associated coupling core T, a resistor 15 and the input winding 12 of the coupling core T of the next stage. Four current pulses are required to operate the system, with alternate ones of the storage cores S having series connected shift winding 11 energized from current sources A and B with windings 14 of alternate ones of the coupling cores energized from current sources C and D.

Figure 2:
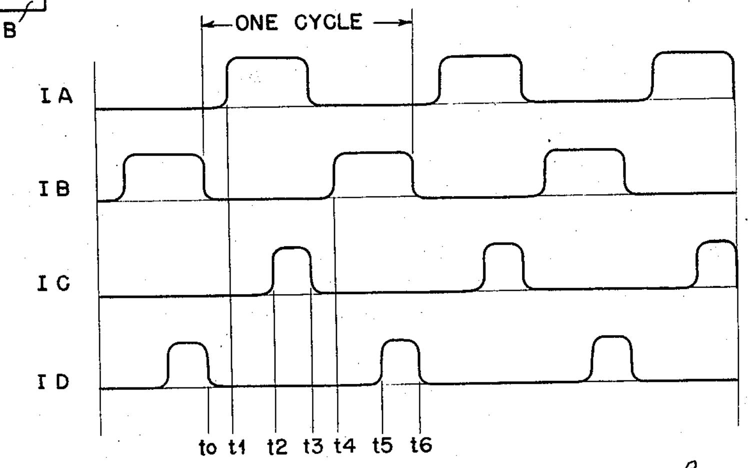
Figure 2 illustrates the relative timing of current impulses employed for operating the circuit of Figure 1.

The sequence of current pulses delivered by pulse generators A, B, C and D is shown in Figure 2. With the shift register operated as a counter, the input and output terminals may be coupled to form a closed ring and a single binary one circulated around the loop in response to alternate $I_A$ and $I_B$ pulses. A number to be counted would then be in the form of an electrical signal operative to control a flip-flop trigger which in turn controls the pulse generators so that successive pulses alternately turn on the A, C and B, D current pulses. Depending upon the number of cores in the ring or the radix employed, an output can be obtained from the last coupling core T for carry and read out indications. Outputs may also be taken from one or more of the storage or coupling cores when such a ring functions as a pulse distribution or timing ring. Obviously the circuit may operate as a delay line with serial information applied to the input and delivered in serial form to the output delayed by the A and B timing shift pulses required for the number of stages employed.

The pulse generators A, B, C and D may comprise electron tube devices, magnetic core drivers or transistor driven pulse transformers of the type described and claimed in the copending patent application of J. B. Mackay et al. Serial Number 511,082, filed May 25, 1955, and which is assigned to the same assignee.

Figure 3:
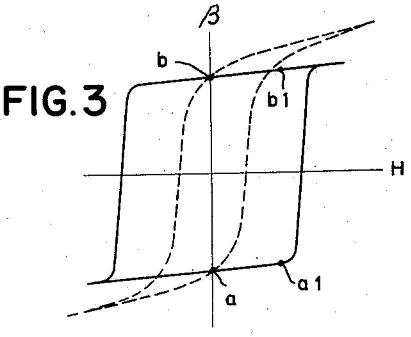
Figure 3 illustrates certain hysteresis characteristics obtained for magnetic materials, with the solid line curve representative of square loop material having a coercive force threshold as required by the storage cores and the broken line curve representative of a saturable material with negligible threshold as may be employed for the coupling cores.

In explaining the operation of the shift register, all of the storage cores except core $S_1$ are assumed to be in a zero remanence state or at point *a* on the solid line hysteresis loop shown in Figure 3. Core $S_1$ is at point *b* which is arbitrarily assigned to represent a binary one state.

The solid line hysteresis loop illustrated in Figure 3 is representative of a typical characteristic for a square loop ferrite core composition, with the vertical axis representing magnetic flux density $\beta$ and the horizontal axis the applied field strength H, wherein the residual flux density is a large fraction of the saturation flux density and the curve has substantially square knees indicative of a threshold coercive force. The coupling cores T may be of square loop material, as before mentioned, or may have a characteristic such as that shown by the broken line curve in Figure 3. These cores are also assumed to be at remanence point *a* as an initial state in explaining the operation.

Referring now to Figure 2 where the sequence of the shift pulses are shown, at $t_1$ time the $I_A$ shift pulse rises and, being directed into the dot marked end of the winding 11, begins to switch core $S_1$ from a one state (point *b*) to the zero state (point *a*). As a result of this flux change a voltage is induced in control winding 10 of core $S_1$ and causes a current to flow in a counter clockwise direction in the winding loop coupling cores $T_1$, $S_1$ and $T_2$. Some of this voltage is dissipated in the drop across the resistor 15, but sufficient voltage appears across the winding 12 of core $T_2$ to switch $T_2$ to a one state (point *b*), with this current entering the winding 12 at the unmarked end. Only a negligible drop in voltage is developed across the winding 13 of core $T_1$ since this core is already in a zero state and the direction of this transfer current tends to retain this state. As the core $T_2$ switches from the zero to the one state, or from point *a* to point *b*, a voltage is induced across its output winding 13 and causes current flow in a counter clockwise direction in the transfer loop coupling the windings of cores $T_2$, $T_3$ and $S_2$. This current flow is in a direction such as to switch cores $S_2$ and $T_3$ to a one state but the winding 10 is provided with a greater number of turns and only core $S_2$ switches state.

The action described thus far has occurred as a result of the shift pulse $I_A$ and the pulse $I_C$ appears after it has been completed. At this point, $t_2$ time, cores $T_2$ and $S_2$ are in a one state or at point *b* on the hysteresis loop and $T_2$ must now be cleared. The current pulse $I_C$ is directed into the dot marked end of reset winding 14 of core $T_2$ and switches this core to a zero state. As this occurs, current flows in the coupling loop including the series connected windings of the cores $T_1$, $S_1$ and $T_2$ tending to switch core $S_1$ back to a one state. Since the current pulse $I_A$ is still on, however, this action is prevented and the energy is dissipated in the resistor 15. Retrograde transfer of the information is thus prevented. Switching of core $T_2$ back to the zero state also causes current flow in the loop coupling the winding 10 of core $S_2$, the winding 12 of core $T_3$, and the winding 13 of core $T_2$. This current is in a direction capable of switching cores $T_3$ and $S_2$ to a zero state, but $T_3$ is already in a zero state and therefore cannot be switched. To prevent $S_2$ from switching and thus destroying the stored information, core $T_2$ is switched at a sufficiently slow rate that the voltage appearing across its output winding 13 and the value of resistor 15 causes a current less than $$\frac{Io}{n}$$

to flow, where I*o* is the threshold current and *n* the number of turns of the storage core winding 10. Resetting occurs between the times $t_2$ and $t_3$ and the following step in one complete operating cycle includes pulsing the storage core $S_2$ from pulse source B with transfer occurring between $t_4$ and $t_5$, and subsequent pulsing of the coupling core $T_3$ from pulse source D with resetting taking place between $t_5$ and $t_6$. The transferring and resetting action in this instance being identical to that described for the first half of the cycle.

Figure 4:
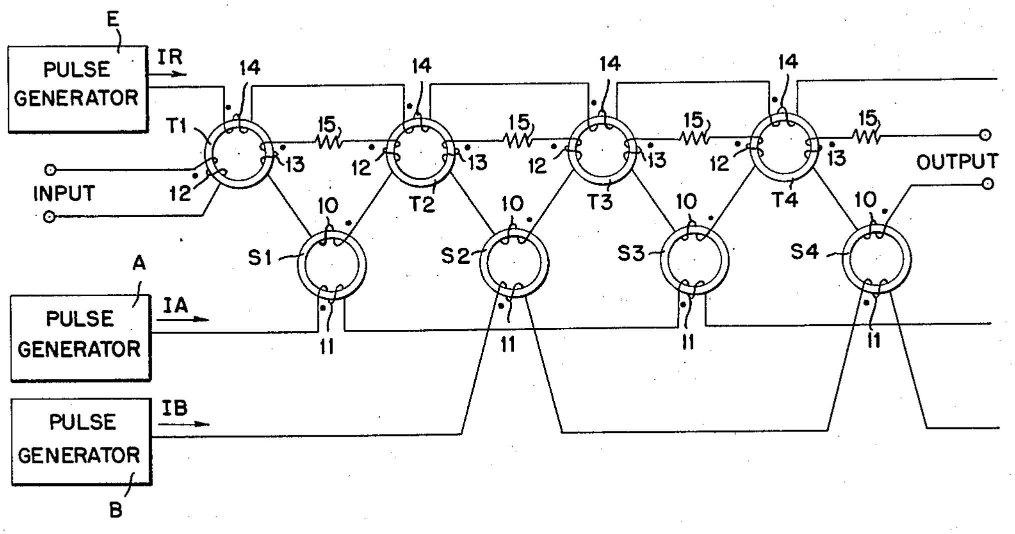
Figure 4 is the circuit diagram of a modified arrangement of the shift register.

As shown in Figure 4, with the coupling cores T having a characteristic such as that shown by the solid line curve in Figure 3, the pulse generators C and D may be combined or a single generator E used having a pulse output $I_R$ developed between $t_2$ and $t_3$ time and also between $t_5$ and $t_6$ time applied in series to the windings 14 of each coupling core T. Since cores $T_2$, $T_4$, $T_6$ etc., are always in a zero state (point *a*) between $t_5$ and $t_6$ time and cores $T_1$, $T_3$, $T_5$, etc., are in a zero state between $t_2$ and $t_3$ time, pulses tending to reset these cores are ineffective and no deleterious pulses are developed if they are of a material having a substantially square hysteresis characteristic. It will be obvious, however, that so long as the core material employed for the coupling cores has a high $B_r/B_s$ ratio it need not be rectangular and no deleterious pulses occur. Further, with either type of core materials, the coupling cores may be reset by a single continuous direct current bias as well as the pulse source shown.

The time required for resetting the coupling cores to a zero state or clearing them after transfer of information from one storage core S to the next succeeding storage core is the primary factor limiting the operating cycle time. This may be improved by the use of coupling cores of square loop material or material with a high $B_r/B_s$ ratio and providing both the storage and coupling cores with a bias current so that the zero and one states are shifted as shown in Figure 3 to points $a_1$ for binary zero and $b_1$ for binary one. Further, the magnitude of the threshold coercive force may be increased to allow higher values of current to flow ineffectively in the transfer circuit and consequently reduce the resetting time.

Figure 5:
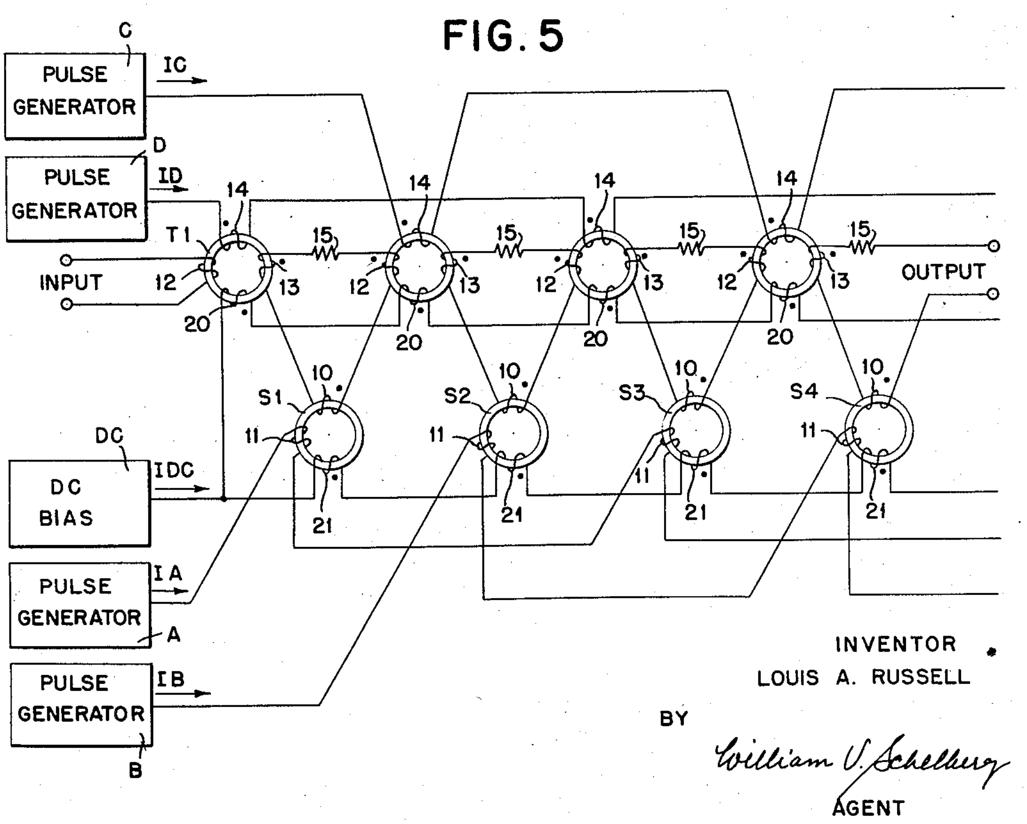
Figure 5 is a circuit diagram of a further modification wherein the cores of the register are biased to allow high speed operation.

An arrangement for providing such a positive bias is shown in Figure 5 with a current source DC energizing a bias winding 20 on each of the cores T and a bias winding 21 on each of the cores S with a current $I_{DC}$ and directed into the winding terminals without a dot marking. With this modification of the circuit, the coupling cores T may be cleared to a zero state (point $a_1$) more rapidly since the bias on the storage cores S to which a core has been transferred tends to maintain them in a one state during the resetting period. With only the storage cores S provided with a bias, the coupling cores obviously may be of non-rectangular material.

In the circuit modifications illustrated and described above, the storage cores S and coupling cores T may comprise toroids of a magnesium-manganese ferrite having an outside diameter of 0.100 inch, inside diameter of 0.070 inch and thickness of 0.210 inch. This thickness may be obtained by stacking seven cores each of 0.030 thickness and winding the group as a single core unit. The windings 10, 11, 13 and 14 may have 10 turns each, the windings 12, 20 and 21 may have 5 turns each and the resistors 15 may have a resistance of 10 ohms. With these constants, current magnitudes used for the arrangement of Figure 5, for example, are as follows: $I_A$ and $I_B$, 380 milliamperes; $I_C$ and $I_D$, 200 milliamperes, and $I_{DC}$, 110 milliamperes. The threshold current $Io$ for a one turn winding=670 milliamperes so that the bias windings 20 and 21 provide $$110 \div \frac{670}{5} = 0.82 Io$$

in the quiescent state. During transfer time the storage cores S have a net magnetomotive force applied of $380 \times 10 - 110 \times 5 = 3.35$ ampere turns or 5 $Io$, and during reset time the coupling cores T have a net magnetomotive force applied of $200 \times 10 - 110 \times 5 = 1.55$ ampere turns or 2.3 $Io$; with set and reset times achieved of 2 and 8 microseconds, respectively.

While particular values are herein disclosed, their inclusion is in the interest of providing a complete disclosure and should not be considered limiting as to parameters suitable for proper operation or the operating speeds attainable with other values or other cores.

Figure 6:
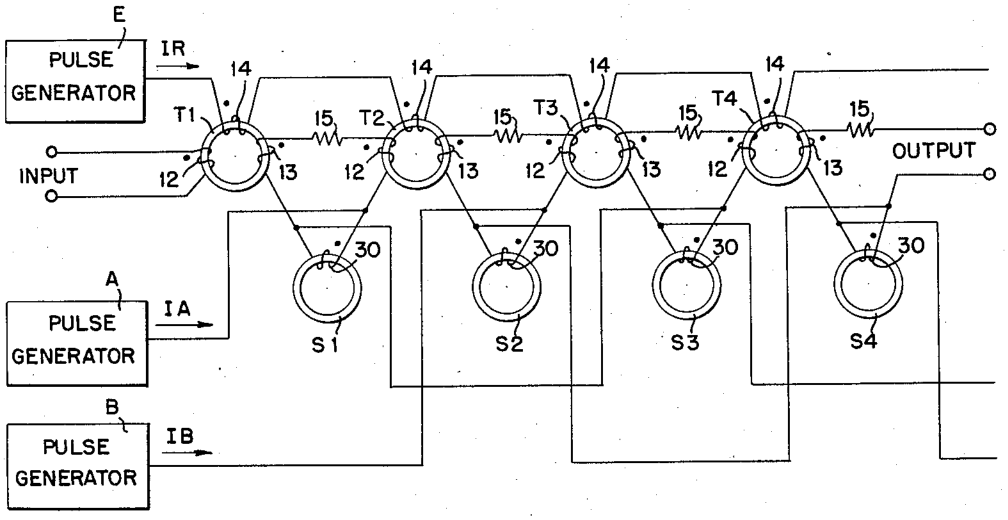
Figure 6 illustrates an arrangement of the register shown in Figure 4 wherein the number of windings provided on the storage cores is reduced.

In certain instances it has been found advantageous to reduce the number of windings provided on a core in addition to the obvious economies involved and an arrangement is shown in Figure 6 wherein the functions of input and output as well as control or shift is combined in a single winding 30 on the storage cores S. Referring to this embodiment, the pulse generator A is coupled to the dot marked terminal of the single winding 30 of alternate ones of the storage cores $S_1$, $S_3$, etc., and the pulse generator B is coupled similarly to the winding 30 of cores $S_2$, $S_4$, etc. In this arrangement the back transfer of pulses developed on resetting the coupling cores T is bucked directly by the A and B shift pulses rather than by a bucking of magnetomotive forces developed in the storage core that is being read out. In this modification the pulse generator E may be replaced by a continuous direct current resetting source as noted previously in connection with Figure 4.

Figure 7:
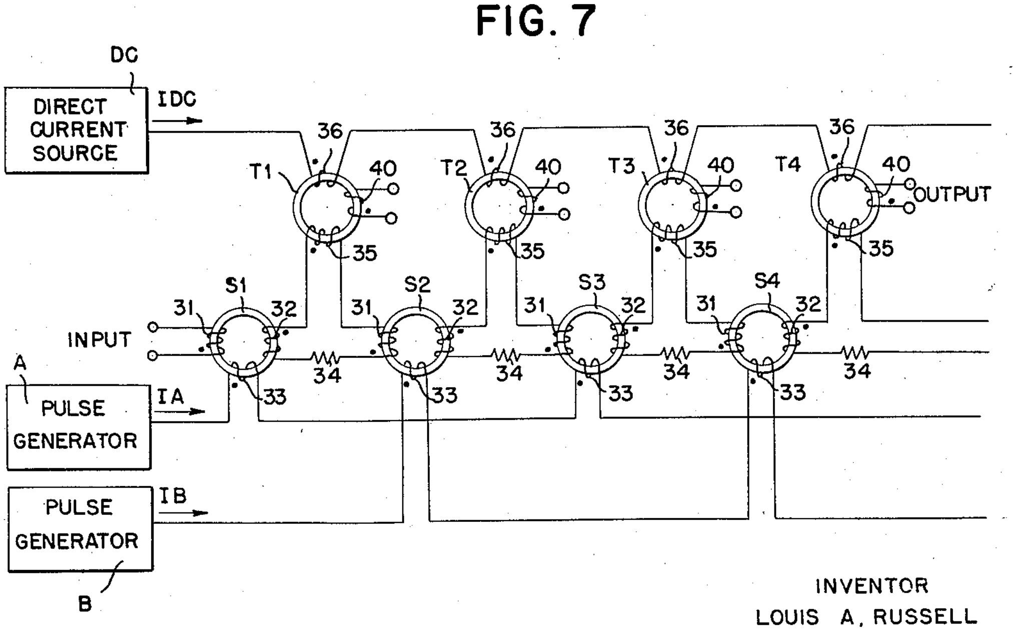
Figure 7 is a circuit diagram of a further modification of a magnetic core register embodying the use of the storage core coercive threshold in preventing spurious response.

Still another embodiment employing the basic operating principle of preventing undesirable pulse transfer through the use of the coercive force threshold in the storage core is shown in Figure 7. Here the storage cores S are of square loop magnetic material while the coupling cores T are only required to have a relatively low saturation to remanence flux density ratio. In the arrangement illustrated, the storage cores S are provided with three windings comprising an input winding 31, an output winding 32 and a shift winding 33. The shift windings 33 of alternate ones of the storage cores are energized from the pulse generators A and B in the manner heretofore employed. The output winding 32 of each storage core is connected to the input winding 31 of the next adjacent storage core through a resistor 34 and a winding 35 of the associated coupling core T. Each of the cores T is also provided with a winding 36 with these windings energized from a source of direct current designated DC.

Current $I_{DC}$ from the source DC continuously flows through the windings 36 and, being directed into the dot marked winding terminal, tends to switch or maintain the cores T in a zero state (point *a* in Figure 3). With this condition maintained, the winding 35 presents a low impedance to current flow into its dotted terminal and a high impedance to current flow in the opposite direction of sufficient magnitude to switch core T to a one state.

To explain the operation, consider core $S_2$ to be storing a binary one and the remaining storage cores to be storing zeros. Upon application of shift pulse $I_B$, the winding 33 of core $S_2$ is energized, with current flow into the dot marked winding terminal tending to switch core $S_2$ to a zero state. As this occurs, the flux change develops a voltage in winding 32 which sends current in a clockwise direction around the loop coupling winding 35 of core $T_2$ and winding 31 of core $S_3$. This transfer current pulse flows into the dot marked end of the winding 35 and consequently sees a low impedance path while it flows into the unmarked end of the winding 31 tending to switch core $S_3$ to a one state.

As core $S_3$ switches to point *b*, the flux change develops a voltage in its winding 32 which tends to transfer into the next stage. This current flow is in a counter clockwise direction however and, being directed into the dot marked end of winding 31 of core $S_4$ sees a low impedance if core $S_4$ is in a zero state or a high impedance if this core is in a one state and is also being switched to zero by the $I_B$ shift pulse.

The forward transfer pulse from core $S_3$ also flows into the unmarked terminal of winding 35 of core $T_3$ which presents a high impedance and switches to a one state. Core $S_3$, therefore, switches to the one state and core $T_3$ switches at the same time reducing the loading on winding 31.

Now considering the back transfer tendency developed when core $S_2$ is switched to zero by $I_B$, if the turns ratio of winding 32 is large with respect to winding 31, then the effect of the pulse from winding 31 is small.

After the switching of core $S_2$ to the zero and core $S_3$ to the one state, shifting the information forward one stage, the coupling core $T_3$ is at a one state as described and must be reset before a shift takes place to transfer the information forward another step. This is accomplished by the current $I_{DC}$ flowing through winding 36 and switching occurs at a rate such that the voltage developed across winding 35 of core $T_3$ is small. Consequently the current magnitude through winding 32 of core $S_3$ and winding 31 of core $S_4$ is below the threshold coercive force of these cores and no change in state results.

As shown in Figure 7, output windings 40 may be provided on the cores T to provide an output signal each time these cores shift from one remanence state to another as may be useful in application of the register as a pulse distributor or frequency dividing device.

Figure 8:
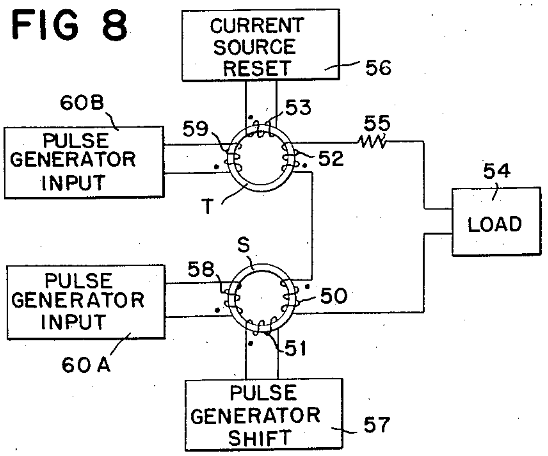
Figure 8 is a circuit diagram illustrating the principle of pulse transfer control according to the invention.

In order to further demonstrate the underlying pulse transfer control principle employed in the foregoing embodiments, a single control unit is shown in Figure 8.

The control and storage functions are accomplished by the storage core S and the associated coupling core T. It is essential that the storage core S exhibit a rectangular hysteresis characteristic, while the coupling core T need only be capable of attaining opposite stable remanence states. However, both cores may be of square loop material as previously mentioned. The storage core S is provided with a control winding 50 and a shift winding 51, and the coupling core T is provided with a control winding 52 and reset winding 53. The windings 50 and 52 are oppositely poled and connected in series with a load device 54 through a resistor 55. The winding 53 of core T is energized from a reset current source 56 and the winding 51 of core S is energized from a shift pulse generator 57. The current source 56 may be a pulsed source or a direct current bias source. The information pulse to be stored and later transferred to the load 54 may be applied to either core S or core T through a winding 58 on core S or a winding 59 on core T from an input pulse generator 60A or 60B, respectively.

Assuming both cores S and T are in a datum remanence condition initially, an input pulse from source 60A applied to winding 58 of core S switches this core to the opposite remanence state. In switching, core S develops an output on its winding 50 which flows in a counter clockwise direction through the load 54, resistor 55 and winding 52 of core T. Some of this voltage is dissipated across resistor 55 but sufficient voltage appears across winding 52, with the current direction into the unmarked end, to switch core T with only a negligible voltage drop appearing across the load 54. The reset current source 56 now functions to reset core T to the datum state and current flow due to the voltage developed in winding 52 at this time is below the coercive threshold of the core S.

The shift pulse generator 57 now functions switching core S to the datum residual state and a voltage is developed in winding 50 which drives current through the load. Since core T is now in a datum state, its winding 52 acts as a short circuit and the developed voltage appears principally across the load 54 so that the information is transferred.

With the input pulse applied to core T through source 60B and winding 59 rather than to core S as described, core T shifts from the datum state to a stored state driving core S simultaneously to a stored state. The reset current source 56 subsequently resets core T and the following shift pulse from the generator 57 switches core S to the datum state and causes the information pulse to be delivered to the load in the same manner as when the input is applied to core S.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a magnetic core shift register, a plurality of storage magnetic cores, control winding means on said cores, a coupling magnetic core associated with each said storage core, said storage and coupling cores capable of attaining a first and a second stable state of residual flux density, input and output windings on said coupling cores, circuit means connecting the control winding means of each said storage core with the output winding of the associated coupling core and the input winding of the next succeeding coupling core of said register, and means for establishing a datum residual state in said storage and coupling cores.

2. In a magnetic core shift register as set forth in claim 1, wherein said circuit means comprises a series circuit including a resistor, and said means for establishing a datum residual state in said storage and coupling cores comprises windings on said storage and coupling cores connected so that groups of alternate storage and coupling cores are energized in succession.

3. In a magnetic core shift register as set forth in claim 1, wherein said circuit means comprises a series circuit including a resistor, and said means for establishing a datum residual state in said storage and coupling cores comprises windings on said storage cores connected so that groups of alternate storage cores are energized in succession and windings on said coupling cores connected for energization at a time later than and during resetting of said associated storage cores.

4. In a magnetic core shift register as set forth in claim 1, means for biasing each of said storage and coupling cores toward one remanence condition including winding means energized from a direct current source.

5. In a magnetic core register, a plurality of storage magnetic cores capable of assuming alternate stable residual magnetic states in representing binary information and having a coercive force threshold, a control winding and a shift winding on each said storage core, means coupling the control winding of adjacent storage cores including a coupling core, said coupling core being changed from a first to a second stable residual magnetic state by read out of one storage core and which change in state causes said coupling core to deliver a read in current pulse to the control winding means of the next adjacent storage core.

6. In a magnetic core register as set forth in claim 5, wherein means are provided for resetting said coupling cores to said first residual state and read out means are provided for sequentially energizing the shift windings of alternate ones of said storage cores.

7. In a magnetic core register as set forth in claim 6 wherein means are provided for biasing each of said storage and coupling cores toward said second residual state including further winding means on each said core energized from a direct current source.

8. A magnetic core register including a plurality of storage magnetic cores each capable of assuming alternate stable magnetic states to represent binary information and having a coercive force threshold, winding means associated with said storage cores, means including coupling cores having winding series connected with the winding means of successive ones of said storage cores, said coupling cores being capable of assuming alternate stable magnetic states, means for transferring information from one storage core into a succeeding storage core including means for pulsing the winding means of alternate ones of said storage cores to cause said storage cores to attain one of said stable magnetic states if not already in said state whereupon the coupling cores associated with said storage cores are changed from a first to a second stable residual magnetic state which change causes delivery of a read in pulse to the winding means of the next successive storage core in said register to cause the latter cores to shift to a second residual magnetic state.

9. A magnetic core register as set forth in claim 8 including means for resetting said coupling cores to said first residual magnetic state without overcoming the coercive force threshold of said storage cores.

10. A magnetic core register including a storage core of square loop type magnetic material, winding means on said storage core, pulse generator means for energizing said winding means whereby said storage core may be driven to a desired state of residual flux density, transfer pulse controlling means coupled to said winding means and comprising a coupling core of saturable magnetic material having winding means thereon, said coupling core shifting from one residual flux state to the other residual flux state in response to a shift in the remanence state of said storage core, and energizing means coupled to the winding means of said coupling core for resetting said coupling core to said one residual flux state subsequent to the shift in remanence state of said storage core and at a rate insufficient to develop a voltage in its winding means so as to overcome the coercive force threshold of said storage core.

11. A magnetic core register as set forth in claim 10 wherein said energizing means comprises a pulse generator.

12. A magnetic core register as set forth in claim 10 wherein said energizing means comprises a direct current bias source.

13. A magnetic core register comprising a storage core capable of assuming alternate stable remanence conditions and having a coercive force threshold, winding means on said storage core, means for energizing said winding means to cause said storage core to attain a desired remanence condition representative of binary information, a homogeneous magnetic coupling core capable of assuming alternate stable remanence conditions, winding means on said coupling core series connected with the winding means on said storage core in a bidirectional current conductive circuit whereupon said coupling core shifts from a datum residual conditon to the opposite residual condition upon a shift in the remanence condition of said storage core, and means for resetting said coupling core to said datum residual state so as to develop a voltage insufficient to overcome the coercive force threshold of said storage core.

14. A magnetic core register as set forth in claim 13 wherein said coupling core is of a magnetic material having a coercive force threshold and means are provided for biasing said cores toward one remanence condition.

15. A magnetic core register including a storage core of magnetic material in which the residual magnetic flux density is a large fraction of the saturation flux density, said storage core having a coercive force threshold and being capable of attaining alternate stable remanence conditions, winding means on said storage core, means for energizing said winding means to overcome said coercive force and cause said storage core to attain a desired flux condition representative of binary information, a homogeneous magnetic coupling core capable of assuming alternate stable magnetic remanence states, winding means on said coupling core series connected with the winding means on said storage core whereupon said coupling core shifts from a first remanence state to a second remanence state in response to current flow in said series connected winding means due to a shift of flux in said storage core from a binary one to a binary zero representing magnetic condition on read out, and means for energizing the winding means on said coupling core for restoring said coupling core to said first remanence state without disturbing the magnetic condition of said storage core.

16. A magnetic core shift register including a plurality of storage magnetic cores each capable of assuming alternate stable magnetic states to represent information; winding means associated with said storage cores; means including a coupling core for coupling the winding means of successive ones of said storage cores, said coupling cores being capable of assuming alternate stable magnetic states; said means including only a resistor and winding means associated with the preceding and succeeding ones of said coupling cores; means for establishing a reference magnetic condition in each of said storage and coupling cores comprising shift pulse circuits coupled to the winding means of alternate ones of said storage cores and to the winding means of said coupling cores; and means for energizing the winding means on said storage and coupling cores with direct current so as to bias said cores in a sense opposite to said reference magnetic condition.

17. A pulse transfer controlling device including a storage magnetic element, winding means on said storage element, a homogeneous magnetic coupling magnetic element, each of said storage and coupling elements capable of attaining a first and a second stable residual state, winding means on said coupling magnetic element operatively connected with the winding means on said storage magnetic element through a bidirectional current conductive circuit, pulse generator means connected to the winding means on said storage element for establishing a datum residual state in said storage element, and current means operatively connected to the winding means on said coupling element for restoring a datum residual state in said coupling element.

18. A pulse transfer controlling device including a storage magnetic core, winding means on said storage core, a coupling magnetic core, winding means on said coupling core, said storage and coupling core capable of attaining a first and a second stable state of flux remanence, circuit means including only a resistor coupling said winding means of said storage and coupling cores in series opposition and to a load device, input means coupled to one of said cores and adapted to set said one core to the first remanence state, means coupled to said coupling core for resetting said coupling core to the second residual state, and means coupled to said storage core for shifting said storage core to the second residual state.

19. A magnetic information storage and transfer device comprising a storage magnetic core capable of attaining alternate stable magnetic states and having a coercive force threshold, winding means on said storage core, a homogeneous coupling magnetic core capable of attaining alternate stable magnetic states, winding means on said coupling core series connected with the winding means on said storage core through a bidirectional current conductive circuit, means for energizing said storage core to cause said storage core to attain a desired binary representing magnetic state and said coupling core to attain a first magnetic state, and means for resetting said coupling core to a second stable magnetic state without disturbing the desired binary representing magnetic state attained by said storage core.

References Cited in the file of this patent

UNITED STATES PATENTS

| | | |
|---|---|---|
| 2,753,545 | Lund | July 3, 1956 |
| 2,768,312 | Goodale | Oct. 23, 1956 |
| 2,781,503 | Saunders | Feb. 12, 1957 |
| 2,784,390 | Li Chen | Mar. 5, 1957 |